United States Patent [19]

Thompson

[11] 4,028,551
[45] June 7, 1977

[54] APPARATUS AND METHOD FOR CORONA DISCHARGE PRIMING A DIELECTRIC WEB

[75] Inventor: Kenneth P. Thompson, Canton, N.C.

[73] Assignee: Champion International Corporation, Stamford, Conn.

[22] Filed: Oct. 17, 1975

[21] Appl. No.: 623,468

[52] U.S. Cl. .............................. 250/531; 204/168; 250/324
[51] Int. Cl.² ..................... H01T 19/04; B01K 1/00
[58] Field of Search ............ 204/165, 204/168–170; 250/531, 324, 325, 326, 527

[56] References Cited

UNITED STATES PATENTS

| | | | |
|---|---|---|---|
| 3,067,119 | 12/1962 | Ramaika | 204/168 |
| 3,772,173 | 11/1973 | Matsumoto et al. | 204/165 |
| 3,871,980 | 3/1975 | Butcher | 204/164 |
| 3,973,132 | 8/1976 | Prinz et al. | 250/531 |

FOREIGN PATENTS OR APPLICATIONS

| | | | |
|---|---|---|---|
| 1,304,762 | 1/1973 | United Kingdom | 250/531 |

Primary Examiner—F.C. Edmundson
Attorney, Agent, or Firm—Evelyn M. Sommer

[57] ABSTRACT

A dielectric web substrate is primed for adhesion of a plastic coating by passing between two rolls in rolling contact therewith. One roll has a conductive core and an insulating jacket while the other roll has a conductive surface. A high voltage A.C. source is connected between the conductive portions of both rolls to establish a corona discharge therebetween to effect said priming. Additional rolls with conductive surfaces may be connected in parallel with the first such roll.

3 Claims, 1 Drawing Figure

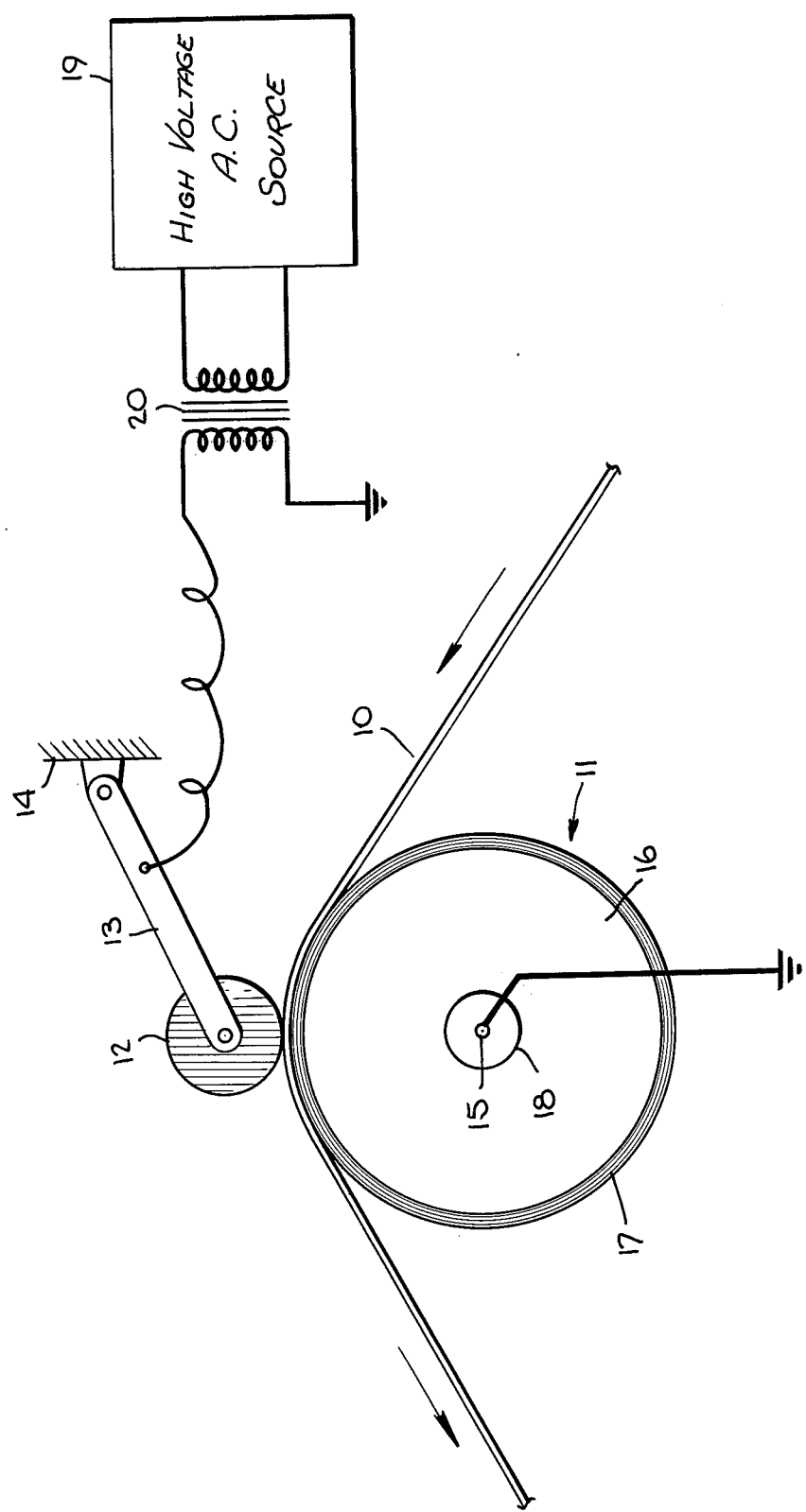

APPARATUS AND METHOD FOR CORONA DISCHARGE PRIMING A DIELECTRIC WEB

The present invention relates to apparatus and method for priming a dielectric substract to promote adhesion of plastic material. More particularly, the invention relates to corona priming to promote adhesion of a coating of polyethylene or the like.

In the production of carton stock for producing containers for milk or the like, a paperboard substrate is coated with polyethylene. Production lines for fabricating the coated stock have been operated at linear speeds in excess of 1,000 feet per minute (fpm). Heretofore, such speeds have been achieved by employing the known flame priming method for treating the substrate. With the advent of the energy crisis alternatives to the flame primary method become desirable.

It is known that a substrate may be primed for plastic adhesion by subjecting the substrate to the action of a corona discharge. Presently available equipment for accomplishing corona discharge priming makes use of bar or plate type electrodes mounted adjacent a back-up roll in spaced relation thereto. The back-up roll is generally provided with an insulated surface or jacket while the bar or plate electrode has a metallic surface.

The normal gap or clearance between the bar electrode and the back-up roll for satisfactory corona treatment is of the order of about 0.060 inches (1.524 mm.). The normal paperboard web may have a thickness ranging between about 0.0155 and 0.024 inches (0.3937 – 0.6604 mm.) and a weight approaching 300 lbs. per ream in a 76-inch wide web. Traveling at 1,000 fpm, the web stores considerable kenetic energy such that any encounter with the bar electrode may damage same or cause an interruption of the web. With the very small gap permitted, cut-outs or tears in the web can produce raised areas greater than the clearance or gap causing destructive impact with the bar electrode. In addition, the webs are spliced periodically thereby introducing a double thickness of the material which, if the leading edge should raise, can result in contact with the bar electrode. By virtue of the foregoing consideration, the stationary bar electrode does not appear attractive for high speed corona treatment of paperboard web stock.

The foregoing problem has been overcome by the subject invention. It has been discovered that the stationary bar or plate electrode may be replaced by a roll electrode making direct rolling contact with the surface of the web.

In accordance with one aspect of the subject invention, apparatus for corona priming a dielectric web substrate for adhesion to plastic material is provided comprising first and second rolls mounted for rotation on parallel axes, at least one of said rolls being mounted for biased movement toward the other roll. Means are provided for training the web therebetween for rolling engagement by both of said rolls. One of said rolls has as its entire web engaging surface the radially outer surface of a thin layer of dielectric material and means for effecting electrically conductive contact with substantially the entire radially inner surface of said dielectric material. The other of said rolls has its entire web engaging surface formed of electrically conductive material. Means are additionally provided for supplying a corona producing voltage between said conductive material and said means for effecting conductive contact.

The invention will be better understood after reading the following detailed description of the presently preferred embodiment thereof with reference to the appended drawing in which the sole FIGURE shows schematically the apparatus for practicing the invention.

Referring to the drawing, the web is shown generally by the reference character 10. It is entrained over a back-up roll 11 and engaged by a nip or idler roll 12. The roll 12 is mounted at the free end of a pivoted support 13 carried by a portion of the frame 14. The back-up roll 11 is mounted for rotation about a stationary axis 15 supported in frame members, not shown. The roll 12 may be formed of aluminum or any other suitable conductive metal to which electrically conductive connection may be made through the support 13. Roll 12 may be solid or hollow, as desired, so long as it has a conductive outer surface conductively connected to support 13. Support 13 is insulated from the frame portion 14 in any suitable manner.

Roll 11 may have a metallic core 16 jacketed with a thin layer of insulating or dielectric material 17. For example, the layer 17 may have a thickness of about 3/16th inch (4.7625 mm.). The metallic core 16 should be connected to ground or to a point of reference potential. This may be accomplished conveniently through the roll shaft 18 or in any other suitable manner.

Voltage for creating the corona discharge is supplied from a high voltage A.C. source 19 supplying a transformer 20 whose secondary winding is connected between ground or the point of reference potential and the conductive support 13 for the roll 12.

In a typical test installation, a roll 12, 3 inches (7.62 cm) in diameter was supplied from a high voltage source 19 consisting of a Pillar corona treater having a rated capacity of 8.4 KVA and a regulated voltage output having a frequency of the order of 10,000 Hertz.

It should be understood, although not shown, that the illustrated apparatus is intended to be associated with a plastic film extruder and the usual supply and take-up rolls for effecting continuous treatment and coating of the substrate.

The subject invention has been tested experimentally with satisfactory results. For the purpose of illustration, the details of such tests will be described. A paperboard web slightly under 24 inches (60.96 cm) in width was coated with polyethylene under varying conditions to test the apparatus. A 4½ inch Egan extruder was employed feeding a 26-inch Johnson Flex-Lip extrusion die. An extrusion melt temperature of 650° F. was employed with a chill roll temperature of 70° F. to coat the paperboard stock with a polyethylene layer having a thickness of about 1 mil (0.0254 mm).

With no priming treatment of the substrate, no adhesion could be obtained at a production speed of 1,000 fpm. However, satisfactory results were obtained with two separate runs wherein the high voltage source 19 was set for an output voltage of 390 volts and a current of 9 amperes to furnish a treating level of 3.5 KVA. One mil thick polyethylene coatings were applied with good adhesion at the operating speed of 1,000 fpm.

To investigate the effect of spacing the conductive roll 12 from the upper surface of the web, it was elevated slightly such that the gap between rolls 11 and 12 was about 1/16th inch. With the source 19 set for an output voltage of 390 volts, the current was about 7.5 amps. for a treatment level of 2.9 KVA. It was found that the resultant coating was stretchy.

The effect of adding an additional conductive roll in contact with the web surface and energized in parallel with the roll 12 was explored. For this purpose, a 2-inch conductive roll (not shown) was mounted similarly to roll 12 and connected electrically in parallel thereto. The results of four separate runs are tabulated below:

| SETTING OF SOURCE 19 WITH 2 CONDUCTIVE NIP ROLLS | | | |
| --- | --- | --- | --- |
| Volts | Amps. | KVA | Adhesion |
| 380 | 14.5 | 5.5 | Good |
| 320 | 10 | 3.2 | Good |
| 360 | 12.5 | 4.5 | Good |
| 380 | 14 | 5.3 | Good |

In addition to the fibrous webs of paper or paperboard mentioned above, the apparatus has been tried in conjunction with the priming treatment of flat polyethylene films.

For commercial production, a back-up roll of about 16 inches in diameter may be employed with a nip roll 3 to 4 inches in diameter and a voltage source having a capacity of about 12 KVA. For satisfactory results the voltage source 19 should have provision for automatically regulating its power output whereby the output, for a given adjustment, is maintained substantially constant in spite of changes in ambient temperature, humidity, line voltage, web thickness or the like.

Having described the invention with reference to the presently preferred embodiment thereof, it will be understood by those skilled in the art that various changes in construction may be effected without departing from the true spirit of the invention as defined in the appended claims.

What is claimed is:

1. Apparatus for corona priming a dielectric web substrate for adhesion to plastic material comprising first and second rolls mounted for rotation on parallel axes, at least one of said rolls being mounted for biased movement towards the other roll, means for training said web between the nip of said first and second rolls for rolling engagement by both of said rolls, one of said rolls having as its entire web engaging surface the radially outer surface of a thin layer of dielectric material and means for effecting electrically conductive contact with substantially the entire radially inner surface of said dielectric layer, the other of said rolls having its entire web engaging surface formed of electrically conductive material, and means for supplying a corona producing voltage between said conductive material and said means for effecting conductive contact.

2. Apparatus according to claim 1, wherein said roll with the web engaging layer of dielectric material comprises a metallic core jacketed with a sleeve of said dielectric material.

3. Apparatus according to claim 1, wherein said means for supplying a corona producing voltage comprises a high voltage A.C. source.

UNITED STATES PATENT AND TRADEMARK OFFICE
CERTIFICATE OF CORRECTION

PATENT NO. : 4,028,551
DATED : June 7, 1977
INVENTOR(S) : Kenneth P. Thompson

It is certified that error appears in the above-identified patent and that said Letters Patent are hereby corrected as shown below:

Column 1, line 6, delete "substract" and insert therefore -- substrate --.

Column 1, line 32, delete "0.024" and insert therefore -- 0.026 --.

Signed and Sealed this sixteenth Day of August 1977

[SEAL]

Attest:

RUTH C. MASON
Attesting Officer

C. MARSHALL DANN
Commissioner of Patents and Trademarks